United States Patent [19]

Kahn et al.

[11] 4,146,652

[45] Mar. 27, 1979

[54] INTERMEDIATE MOISTURE, READY-TO-USE FROZEN WHIPPABLE FOODS

[75] Inventors: Marvin L. Kahn, Williamsville; Eapen K. Eapen, Kenmore, both of N.Y.

[73] Assignee: Rich Products Corporation, Buffalo, N.Y.

[21] Appl. No.: 763,613

[22] Filed: Jan. 28, 1977

[51] Int. Cl.$^2$ .................. A23G 9/00; A23G 9/02; A23C 11/00
[52] U.S. Cl. .................. 426/564; 426/570; 426/572; 426/61; 426/553; 426/565; 426/589; 426/573; 426/602; 426/613; 426/597; 426/599
[58] Field of Search .................. 426/570, 572, 564

[56] References Cited

U.S. PATENT DOCUMENTS

| 3,253,928 | 5/1966 | Bedenk | 426/572 |
|---|---|---|---|
| 3,353,965 | 11/1919 | Patterson | 426/570 |
| 3,464,830 | 9/1969 | Wahba | 426/572 |
| 3,935,324 | 1/1976 | Persmark | 426/572 |

Primary Examiner—Jeanette M. Hunter

[57] ABSTRACT

Microbiologically stable intermediate-moisture whippable or whipped foods which remain soft and ready for use at freezer temperatures and which can be maintained at room temperature and refrigerator temperature for an extended period of time having an oil-in-water emulsion with a controlled sugar-fat ratio. The foods contain 15–45% water, sugar in a ratio to water of 1–2:1, about 2.5 to 30% fat, the sugar comprises at least one of fructose, dextrose plus fructose is at least 50% of the total sugar and at least one unsaturated fat. Water activity of the products are from about 0.8 to 0.9.

28 Claims, No Drawings

INTERMEDIATE MOISTURE, READY-TO-USE FROZEN WHIPPABLE FOODS

BACKGROUND OF THE INVENTION

A recent development in the food industry is the emphasis on intermediate moisture foods which have the faculty of being stored and marketed in a substantially non-refrigerated condition. These foods were designed to avoid the need to be packaged in a hermetically sealed container and commercially sterilized or maintained in a frozen or refrigerated state throughout the period of distribution and storage by the consumer.

The intermediate-moisture foods are based on the principle of reducing the availability of the water in the food for microbial growth. The availability of water for spore germination and microbial growth is closely related to its relative vapor pressure, commonly designated as water activity. It was found that the use of a wide variety of water-soluble solutes, or osmotic agents, has the effect of depressing the water activity of the foods to levels at which most bacteria will not grow.

The water activity of a food is defined as the partial pressure of water in the food divided by the saturation pressure of water at the temperature of the food. The water activity can be determined by placing a sample in a container which is then sealed, and after equilibrium is reached determining the relative humidity above the sample. Most products of this type have between 10 and 40% moisture, and a water activity between 0.65 and 0.9.

An early application of the technique of controlling water activity was for animal foods. For example, U.S. Pat. No. 3,202,514 discloses an animal food having 15–30% moisture and 15–35% water-soluble solids, principally sugar, with a proteinaceous meaty substance. Subsequently, other foods were formulated with an intermediate moisture content, such as egg products (U.S. Pat. No. 3,640,731), pancake batter (U.S. Pat. No. 3,753,734) and whippable bases for confectionary use (U.S. Pat. No. 3,958,033). The water content and water activity of these foods are brought to as low a value as practical to insure their long-term stability without refrigeration. The main difficulty with these foods is that their low moisture content may detract from their palatability, texture and mouth-feel. This technique therefore has found its greatest commercial applicability in the pet-food market where palatability requirements are not as stringent.

It is of course desirable to be able to avoid refrigeration and freezing of food products to reduce the cost involved and, particularly for the consumer, to avoid the inconvenience of unpacking, handling, and then defrosting the typically rock-hard frozen foods. However freezing is an extremely safe and suitable technique for long term storage and provides the manufacturer with great leeway in incorporating any of a wide variety of ingredients in foods which would otherwise be short lived.

It is an object of this invention to provide a class of foods which are normally kept at freezer temperatures, but upon removal from the freezer can be more readily handled and used because they retain a flexible consistency, and which possess microbiological stability so that they can be left at room temperature. Other objects, and advantages, of this invention will be set forth in the following detailed description.

THE INVENTION

This invention is directed to intermediate-moisture foods and other products which remain ready to use at freezer temperatures. The principles and techniques which have been developed for intermediate moisture foods are applicable to the present invention, as modified in the manner explained herein to provide foods which are maintained at freezer temperatures in a condition ready for intermediate use without defrosting. After removal from the freezer the foods may be held at room temperature or refrigerator temperature for a considerable period of time without spoilage.

The foods of this invention are characterized by a high sugar content, at least equal in weight to the amount of water present in order to provide microbiological stability. The sugars used have a low molecular weight—mainly dextrose and fructose, which comprise together at least about 50% and preferably at least about 75% of the total sugar content. Sucrose has a sweetness between that of fructose and dextrose. The Fructose, which is sweeter than dextrose, is preferred since it has a lesser tendency to crystallize and cause apparent hardness. For most foods, particularly where the food comprises an emulsion, it is preferred that the fats used include partially unsaturated fats which tend to provide superior flow properties, and nutritional advantages although less stable than saturated fats. The fat content is usually less than the water content in order to form a stable oil-in-water emulsion; the water content is preferably at least about 25% greater than the fat content.

An important group of foods which have been particularly well-adapted in accordance with the present invention are oil-in-water emulsions, including butter creams, whipped toppings, low-fat whipped creams, milk mates, non-dairy shakes, icings and coffee creamers.

Another class of goods, which forms a unique combination with the foregoing, is bakery products—such as cakes, breads, cookies, pie shells, muffins, turnovers, pancakes, waffles and donuts. The pastries can be filled or topped with the creams and icings of this invention.

Many diverse foods can likewise be adapted pursuant to this invention, such as dressings, puddings, sauces, gravies, snack spreads, pancake syrups, ice creams, candies, and beverage (soup, tea, juice) concentrates, and meat, fish, fruit or vegetable products.

The foods of this invention are generally characterized by a water activity of about from 0.75 or 0.8 to 0.9, a sugar to water ratio of at least 1:1, a sugar content which is at least 50% dextrose and/or fructose, and adapted to remain spoonable or pourable at freezer temperatures. Although most intermediate-moisture products will continuously have a water activity below 0.85 some sacrifice in texture and taste may be required to meet this standard. Since the foods of this invention are maintained at freezer temperatures until ready to be used, a water activity of about from 0.85 to 0.90 is adequate. Freezer temperature, unless stated otherwise, refers to temperatures of about from −5° F. to +10° F. which is a common range for freezers in homes and stores.

The standard of being spoonable refers to the texture or flexibility of the product—and the quality of being able to eat the food when it is at freezer temperature. The quality of being spoonable as used in this description is one which gives a satisfactory reading on a standard penetrometer and/or flow test, as described in detail below. Pourable products are more fluid and are tested by flow characteristics.

The spoonable products of this invention gave a penetrometer reading above about 3 mm, and when also pourable the products gave a flow rate of about 30 ml. per minute and higher during the first five minutes after removal from the freezer. These figures are highly significant when compared to the standard frozen products presently on the market.

The water activities of the foods of this invention are usually from about 0.75 to 0.9. Generally the water activity is at the higher end of this range, i.e. about from 0.85 to 0.9. Although microbiological stability is inversely proportional to water activity several desirable properties of food are adversely affected at very low water activity—such as mouth-feel and taste. Since the foods of this invention are normally held at freezer temperatures for long-term stability, it is practical to formulate foods which have water activities nearer the border-line of microbiological stability, which is about 0.9. Freezer temperatures of course are adequate to maintain the microbiological stability of foods and even moderate control of water activity is adequate to extend the useful life of these products after removal from the freezer.

Several mathematical methods are available for calculating water activity, even of formulations containing different solutes and with non-solutes. Rough calculations based on the additive effect of the number of moles of each component multiplied by the activity of the component are useful for estimating water activity. Such calculations reduce the number of experimental measurements that might otherwise be needed and thus assist in reaching a suitable formulation more quickly. A combination of mathematical techniques with trial and error experiments followed by analytical measurements for determining water activity will lead to acceptable results.

There are commercially available devices for measuring the water activity of formulations. For example, a formulation may be placed in a container until equilibration is reached and then the humidity in the container measured—based on standard tables the water activity is then determined. For example, electric hygrometers are devices commonly used to measure water activity. These devices contain sensors impregnated with salts such as lithium chloride or potassium chloride. Water is adsorbed on the sensor and causes a change in electrical resistance which is measured by a wheatstone bridge. Reference curves based on solutions of known humidity are used to relate the electrical readings to water activity.

Throughout this application all amounts are by weight unless states otherwise. In the examples the amounts have been adjusted to a basis of 100. Percentage are based upon total formulation weight, unless a different basis is given.

The foods of this invention are generally characterized as microbiologically stable food products comprising about from 15 to 45% water, sugar in a ratio to water of about from 1:1 to 2:1, preferably about from 1-1.5:1, about from 2.5 to 30% fat, and minor but effective amounts of salt, emulsifier, stabilizer and flavoring, provided that the amount of fat is less than the amount of water or equivalent phase, such as non-aqueous water-soluble liquid phase, the solutes content is adequate to provide the product with a water activity of about from 0.8 to 0.9, the amount of dextrose plus fructose is at least about 50% based upon the total sugar content, wherein the foregoing ingredients comprise at least one of fructose and unsaturated fat and the product in spoonable at about 10° F.

A preferred class of foods is microbiologically stable oil-in-water cream-type products, such as butter creams, whipped creams, shales, non-dairy creamers, etc. which comprise about from 25 to 45% water, sugar in a ratio to water of about from 1.5-1:1, about from 10 to 30% fat, and minor but effective amounts of protein, salt, emulsifier, stabilizer and flavoring, a water activity of about from 0.8 to 0.9, wherein the amount of fructose is about from 15 to 65% based on the sugar content and the amount of dextrose is at least about 50% based upon the remaining total sugar content, the fat content preferably comprises at least, about 10% unsaturated fat and the foregoing ingredients are adapted to provide a product which will flow at about 10° F. These products have excellent texture and eating properties and are readily whipped to a high volume with a light but firm structure. In addition to microbiological stability these products have physical stability in that they retain a smooth foamed cellular structure without separation of a liquid portion. The products are further characterized by having an overrun of greater than about 150% and a density as low as about 0.3 or 0.4 for a butter cream and whipped cream.

Another class of useful products is the flour-based foods. The batters for these products comprise conventional amounts and types of flour depending on the final product, about from 15 to 40% water, sugar in a ratio to water of about from 1.5-1:1, about from 2 to 10% or up to 25% fat, and minor but effective amounts of leavening agent which may be encapsulated, egg products, salt, emulsifier, stabilizer and flavoring, provided that the solutes content is adequate to provide the product with a water activity of about from 0.8 to 0.9, the fructose content of the sugar preferably is about 10 to 40%, the amount of dextrose plus fructose is at least about 50% or from 75 to 100% based upon the total sugar content, and the fat is preferably unsaturated. The batter should have at least one of fructose and unsaturated fat to assist in providing a spoonable and preferably pourable product at about 10° F. The final product made from the batter has a higher penetrometer value than conventional products at 10° F. and is edible at that temperature.

A unique combination is prepared from a bakery product and a cream-type product, each made in accordance with this invention. The water activity of each should be approximately the same, plus or minus 0.05 units, or up to 0.10 units deviation from each other. When the water activity values are comparable there is less of a tendency for water transfer as, for example, between a cake and its topping or filling.

Microbiologically stable soup concentrates and sauces have been made comprising about from 30 to 45% water, sugar in a ratio to water of about from 1-1.5:1, about from 5 to 30% fat, and minor but effective amounts of salt, stabilizer and flavoring, wherein the amount of dextrose plus fructose is at least about 50% based upon the total sugar content, the foregoing ingredients comprise at least one of fructose and unsaturated fat and the product is spoonable at about 10° F. Fish, meat and vegetable (which may be infused with solutes) are added to these to provide, for example, a chowder concentrate or newburg sauce.

Microbiologically stable beverage concentrates, for tea, orange juice, etc. are made in accordance with this invention. They comprise about from 35 to 45% water, sugar in a ratio to water of about 1.2-1.8:1, and minor but effective amounts of flavoring, provided that the amount of fructose plus dextrose is about from 75 to 100% based on the total sugar content and the amount of fructose is about from 10 to 30% based upon the total sugar content, wherein the foregoing ingredients are adapted to provide a product which will flow at about 10° F.

Microbiologically stable pudding products have been made comprising about from 25 to 45% water, sugar in a ratio to water of about from 2-1:1, about from 3 to 25% fat, preferably unsaturated, and minor but effective amounts of gelling agent, emulsifer, stabilizer and flavoring provided that the amount of dextrose plus fructose is at least about 75% of the total sugar content, and wherein the foregoing ingredients are adapted to provide a product which is spoonable at about 10° F. Suitable products include bread, rice, and plum pudding.

The freezing and melting points for a number of products were determined using a Perkin-Elmer Scanning Calorimeter 1B.

Since the scanning calorimeter is a dynamic measuring device, definitions used for static systems were established for this scanning system. The measurements were taken under conditions at which the temperature was being varied at 18° F. per minute. During the cooling cycle, the point at which the maximum change in heat is occurring, was defined as the freezing point (F.P.) and conversely during the heating cycle, the maximum was defined as the melting point (M.P.).

The values obtained are not for correspondence with points measured by other standard methods, but they will correspond proportionally to each other under this system. Therefore the measured freezing point for water was $-14.8°$ F. and the melting point was 41° F. The values for the various products are listed below:

|  | Commercial Standards | | Formulation Of Examples | | |
| --- | --- | --- | --- | --- | --- |
|  | F.P. | M.P. | F.P. | M.P. | Example |
| Puddings | $-9.4°$ F. | 30.2° F. | $-135°$ F. | 5.0° F. | 12 |
| Sour Dressing | 1.4° F. | 33.8° F. | $-135°$ F. | 5.0° F. | 11 |
| Pancake Batter | 1.4° F. | 26.6° F. | $-31.0°$ F. | 10.4° F. | 9 |
| Whip Topping | $-14.8°$ F. | 30.2° F. | $-61.6°$ F. | 8.6° F. | 2 |

In each instance the products of this invention showed a highly significant variance from commercial formulations and from water itself—the freezing and melting points were depressed by from 15 to over 100° F.

The apparatus for measuring the flow characteristics was fabricated from stainless steel, and was essentially a stand 14" × 12", with a movable platform of the same size to provide for vertical and angular adjustments. The platform was provided with a bulls-eye level and a protractor level; with the leading edge having a wire brace to retain the sample container.

The following method was used in obtaining the flow data. Samples were filled in graduated cylinders of 600 ml. capacity, and frozen for at least 24 hours at +5° F. The frozen samples were removed from the freezer, immediately placed on the platform in a horizontal (0°) position, and the effluent collected in graduated cylinders, noting the volume at timed intervals. Temperatures were monitored with a Honeywell recorder. Sample temperatures within the freezer, varied from +4° F. to +7° F., over a four-week interval, but varied no more than 1° F. over an 8 hour period; while the temperature in the freezer varied from +5° F. to +15° F., each time the door opened. Room temperature varied about 2° F., for an average of 72° F., while the temperature of the samples in the original container, rose anywhere from 1° F. to 14° F., during the 15 minutes after being removed from the freezer.

The penetrometer test and equipment used are standard. The penetrometer is made by Labline Instrument Co. Inc., Chicago, Ill. The device measures the penetration into the sample of the point of a hard rubber cone which weighs 12 grams, and has a height of 1½" and a diameter of 1½" at its base. The inverted cone is supported by a freely-sliding bar which weighs 48 grams. For all measurements the sample was brought to a temperature of minus 7° F. in a freezer and then removed from the freezer and immediately tested.

The products of this invention exhibited freeze-thaw stability in storage. The products were kept in a supermarket type freezer unit which cycled six times a day between application of cooling to freeze the product and application of heat to defrost the unit. Under these conditions the products remained acceptable and functional. The whipped products were tested by the following procedure. The samples were placed in quart sample containers for three (3) days at 0° F. then transferred to 40° F. and held for two (2) days. The product was examined and the cycle repeated. The products withstood at least two (2) such cycles, and thus were considered freeze-thaw stable.

The liquid emulsions were examined by dipping a spatula in the emulsion; letting it drain and noting whether the residual film was smooth and uniform or whether particles were present—denoting destabilization. These emulsions were also evaluated for their intended functional application.

The products passed the following test procedures:
(a) Whipped or aerated products were tested for volume (density) and the ability of the foam to remain stable—loss of volume due to air loss and/or for syneresis (separation of the water phase). This was applied to butter cream, toppings and shakes.
(b) The non-dairy creamer concentrates, were tested in coffee for whitening ability; signs of free oil on the surface or curdled appearance, presence of oil globules or curdling indicate emulsion break down.
(c) The baking product doughs and batters were tested for their ability to puff and/or bake properly. This category included donuts, cakes and pancake batters.
(d) The semi solid products which are consumed as such—puddings, sour dressing, cocktail sauce and yogurt were tested for syneresis and appearance (texture).
(e) The products which are heated or reconstituted—iced milk mate, tea, orange juice drink, newburg sauce, clam chowder were evaluated for their sensory properties, i.e. mouth feel and separation of phases.
(f) The ice cream was tested for volume and texture (graininess).

A preferred method for preparing an emulsion product of this invention comprises blending all of the ingredients in the desired ratios. Usually most of the non-fat ingredients are first dispersed in the water. The ingredients are heated prior to or during blending. For example the heating may begin during the mixing of the non-fat ingredients, and then the emulsifiers and fats are added. The fat portion may also be preheated and then mixed in. The ingredients are pasteurized by holding at an elevated temperature for several minutes, i.e., at 180° F. for five minutes.

The blended ingredients are then passed through a homogenizer of the typical dairy type. Although homogenization may be accomplished in one stage, it is carried out in two stages for best results. Preferably, the pressure during the first stage is maintained at a minimum of about 2,000 psi and a maximum of about 10,000 psi, most preferably about 3,000 psi, and the pressure during the second stage is maintained at about 500 to 1,000 psi, preferably about 500 psi. The mix is usually maintained at a temperature of from about 60° to 75° C. during homogenization. The emulsion is cooled to a temperature of from about 0° to 25° C. and passed through a whipper for the incorporation of air or an inert gas such as nitrogen, carbon dioxide, nitrous oxide or the like. The whipper may be of conventional construction such as a Hobart mixer or an Oakes continuous mixer that permits cooling of the emulsion to temperatures of about 5° to 15° C., preferably 10° C., during whipping. The emulsion can be whipped to an overrun of from about 100% to 500%, packaged and frozen.

Sugar is employed as the principal source of water soluble solids and typically may range in weight percentage of the composition anywhere from 30% to 60% depending upon the particular sugar and sugar mixture relied upon to offer the desired bacteriostatic protection. As the moisture content of the product increases in the intermediate moisture range, the level of a given sugar will correspondingly increase in order to maintain a sufficient bacteriostatic effect. The level of sugar chosen will also vary depending upon the presence and level of auxiliary water soluble solids also offering a similar increase in osmotic pressure to the aqueous phase of the composition; thus, a variety of low average molecular weight materials may be included as part of the water soluble solids in the aqueous phase and will augment the sugars in their role of providing sufficient osmotic pressure to prevent bacterial decomposition.

The term "water soluble solids" is used to apply to any additive material which is substantially soluble in water at room temperature or at temperatures comparable to those practiced in processing the ingredients of the foods. Included in the class of water soluble non-sugar solids that can be employed are certain inorganic salts used at a level compatible with palatability requirements, e.g., sodium chloride and potassium chloride. Indeed, certain compounds like the diols and polyols, propylene glycol, sorbitol, glycerol and the like which have another function, i.e., as an anti-mycotic and/or texturizer, may also be relied upon to provide the soluble solids (or solutes) employed in the aqueous phase for bacteriostatic protection. Propylene glycol is prominent in this respect since it is capable of serving a multiple role as mold initiator and plasticizing humectant for texture as well as contributing to the water soluble solids of the aqueous phase. The higher diols, such as the aliphatic 1,3-diols containing four to fifteen carbon atoms in the aliphatic chain and their esters which are completely metabolized, can also be used, particularly in conjunction with the foregoing sugars and sugar-substitutes. These diols also assist in maintaining the foods in a bacteria-, yeast- and mold-free state while providing softness or plasticity to the formulations. These materials are stable, non-volatile oils with good storage and shelf life, appreciable water solubility, and are readily emulsified and formulated into various food preparations.

The relative weight percent of said water soluble solids to the moisture content of the total product, when initially incorporated into the product during its manufacture and preparatory to packaging determines the ultimate functionality of the solids in providing the requisite bacteriostatic effect. The level of water soluble solids may be varied as may the level of moisture initially incorporated within the aforesaid respective ranges. However, in varying these levels the relationship of water soluble solids in solution to the water should be controlled so as to afford the desired osmotic pressure. A good rule to observe in this connection is to be sure that the weight of water soluble solids available for solution is at least equal to the weight of the moisture present, although in some cases it is possible that a lower level of water soluble solids might afford some protection against microbiological decomposition provided an equivalent degree of osmotic pressure is available. In any event, it will be found that the level of sugar that should be employed under the conditions of the present invention will constitute a major percent by weight of the water soluble solids.

Intermediate moisture foods have a high sugar content which tends to promote nonenzymatic browning. This phenomenon is caused by complex reactions between the amino groups of proteins and the keto groups of sugars and is known as the Maillard Reaction. This nonenzymatic browning leads to undesirable darkening of the food product as well as off-odors and flavors. These reactions can also reduce the nutritional value of foods. Sugars such as dextrose are known to be capable of use at a lower level than sucrose to achieve an equivalent bacteriostatic effect but are reducing saccharides which are prone to undergo the undesirable Maillard-type reaction. Fructose is even more susceptible to the browning reaction. This reaction and other oxidative reactions are progressively retarded as the temperature is lowered from room temperature to refrigerator temperature to freezer temperature. Hence the products of this invention preferably are designed for usage at refrigerator and freezer temperature unlike the conventional intermediate moisture foods which are stored and used at room temperature, and thus the foods of this invention can tolerate the large amounts of dextrose and fructose used.

The term "sugar" as it is employed in the present context is to be understood as meaning any of a number of useful saccharide materials which are capable of increasing the osmotic pressure of the water in which they are dissolved and thereby giving rise to the requisite bacteriostatic effect. Included in the list of useful sugars are the mono-saccharides, di-saccharides and polysaccharides and their degradation products; e.g., pentoses, including aldopentoses, methylpentoses, keptopentoses, like xylose and arabinose; a deoxyaldose like rhamnose, hexoses and reducing saccharides such as aldo hexoses like glucose, galactose and mannose; and ketohexoses, like fructose and sorbose; disaccharides, like lactose and maltose; non-reducing disaccharides such as a sucrose and other polysaccharides such as dextrin and raffinose; and hydrolyzed starches which contain as their constituents oligosaccharides. Typically, the commercially available mixtures of invert sugars are used which contain dextrose and levulose, as well as maltose and corn syrup solids. The sugars should be of a low molecular weight so as to offer a substantial effect in increasing the osmotic pressure of the sugar solution. The polyhydric alcohols may be used to replace a portion of the sugars used in this invention and are therefore encompassed by that term, i.e., from about 0.5 to 5% of the formulations may be a polyhydric alcohol such as glycerol and the like.

Since the product of this invention, when prepared in the manner herein disclosed, is characterized by its substantial resistance to bacterial decomposition, but may serve as a host for yeasts and mold, the foods of this invention may have an antimycotic agent incorporated at a sufficient level to prevent the growth of such organisms. Sorbate salts such as potassium sorbate as well as sorbic acid can be used either separately or in combination. Propylene glycol which may be used alone or with other humectants like sorbitol to impart a further degree of product softness of tenderness can also serve as an anti-mycotic. Other anti-mycotic agents will be apparent to those skilled in the art. The amount of anti-mycotic agent added is selected so as to produce the desired results and will constitute a minor proportion of the product, about 0.1% or higher, depending on the particular anti-mycotic and the particular product composition, although even lower levels in the order of 50 p.p.m. can be employed in the case of some anti-mycotics as pimarcin. Potassium sorbate in a water solution can be sprayed into the surface of the food or the food can be dipped in this solution; other anti-mycotics lend themselves to such surface application as esters of the parabens (para-hydroxy benzoate) such as propyl and methyl parabens (methyl para-hydroxy benzoate). Cellophane and other enwrapments for the food can be spray coated with a sorbic acid solution but impregnation or dusting with sorbic acid or potassium sorbate is preferred. Anti-mycotics which can generally be used are benzoic acid, sodium benzoates, proprionic acid, sodium and calcium proprionate, sorbic acid, potassium and calcium sorbate, propylene glycol, diethyl pyrocarbonate, and menadione sodium bisulfite (vitamin K).

Other ingredients known to those skilled in the art may also be employed to impart their characteristic effects to the compositions of the present invention. Typical of such ingredients are flavoring agents, colorants, vitamins, minerals, and the like. Suitable flavoring agents can be employed to impart vanilla, cream, chocolate, coffee, maple, spice, mint, butter, caramel, fruit and other flavors. Additionally, the use of certain polyols such as sorbitol and mannitol can be employed to modify mouth-feel. Furthermore, other additives such as phosphates and the like may be employed for their known functions. Several types of ingredients used are described below.

Fats high in unsaturation are safflower oil, corn oil, soybean oil, cottonseed oil and sunflower oil—unsaturated fats as used in this specification are those having an iodine value of about at least 50 which include partially hydrogenated fats, and the more highly unsaturated fats with an iodine value above about 100. These fats are recommended for dietary purposes, particularly for those with a high plasma cholesterol level which is associated with atherosclerosis.

The saturated fats include the hydrogenated oil products of coconut, cottonseed, corn, soybean, peanut, olive, etc. Fats having a melting point of 90°-94° F. are preferred, i.e. the melting point should be below body temperature.

Emulsifiers are necessary ingredients of those composition of the present invention which contain fats and are oil-in-water emulsions. A wide variety of emulsifiers may be employed in amounts on the same order as in the prior art oil-in-water emulsions for example, about from 0.1-5%, preferably about from 0.2-1.5%. They induce the formation of a stable emulsion and improve the rate and total aeration obtained. Among the more suitable are: hydroxylated lecithin; mono, di, or polyglycerides of fatty acids, such as monostearin and monopalmitin; polyoxyethylene ethers of fatty esters of polyhydric alcohols, such as the polyoxyethylene ethers of sorbitan monostearate (polysorbate 60) or the polyoxyethylene ethers of sorbitan distearate; fatty esters of polyhydric alcohols such as sorbitan monostearate; mono- and diesters of glycols such as propylene glycol monostearate, and propylene glycol monopalmitate, succinoylated monoglycerides; and the esters of carboxylic acids such as lactic, citric, and tartaric acids with the mono- and diglycerides of fatty acids such as glycerol lacto palmitate and glycerol lacto stearate. The fatty acids employed in the preparation of the emulsifiers include those derived from beef, tallow, and coconut, cotton seed, palm, peanut, soybean and marine oils. Many blends of emulsifiers are commercially used and readily available in accordance with known techniques. For example, it may be desirable to provide a controlled hydrophil-lipophil balance (HLB) as with a lipophilic emulsifier such as glyceryl monostearate or sorbitan monostearate with a hydrophilic material such as polysorbate 60.

The emulsion compositions of the present invention also include one or more stabilizers or hydrophilic colloids to improve the body and texture of toppings, and as an aid in providing freeze-thaw stability. These stabilizers are natural, i.e. vegetable, or synthetic gums and may be, for example, carrageenin, guar gum, alginate, xanthan gum and the like or methylcellulose, carboxymethylcellulose, ethylcellulose, hydroxypropyl methylcellulose (Methocel 65 HG), micro-crystalline cellulose and the like, and mixtures thereof. Typically, a gum or combination of gums is employed with a sugar, e.g. dextrose, carrier. The amount of these stabilizers can be varied widely in accordance with the amounts required in prior art compositions, generally about from 0–2%, preferably about from 0.1–0.5%.

Starches useful in this invention include the new and chemically modified starches from potato, arrow root, corn, rice, wheat, waxy maize, sorghum and waxy sorghum. Tapioca starch is suitable particularly for puddings. Generally about from 0.5 to 2.5% starch is adequate, although in the absence of stabilizers or in some puddings up to about 7% may be used.

Protein concentrates and isolates are useful to improve the nutritional qualities of the product and to facilitate and maintain a whipped structure. Protein also aids in emulsification and contributes to flavor. Bland protein concentrates with a wide range of fiber content, bland soy flour, milk powder and food proteins are all useful, generally in concentrations about from 0–10%, preferably about from 0.3–3%. Alternatively, use can be made of a protein such as sodium or calcium caseinate which is conventional in whipped toppings, or as its substitute a protein hydrolysate in a minor amount.

Many types of salts are used in the compositions of this invention for flavoring, including common salt (sodium chloride), sodium or potassium phosphates, citrates, chlorides, and the like, in amounts about from 0–5%, but preferably about from 0.1–1%.

Antioxidants such as butylated hydroxytoluene, butylated hydroxyanisole and tertiary butyl hydroquinone may be used in minor amounts (i.e. as Tenox 22 antioxidant).

Food grade acidulants such as phosphoric, tartaric, malic, citric, fumaric, hydrochloric and the like edible food acids are suitable to impart tartness, control pH or serve as a preservative.

The following are among the ingredients used in this invention:

The maize starch used is a highly modified waxy starch of amylopectin origin sold under the names (a) Amaizo Polar Gel 10 by American Maize-Products Co., New York, New York and (b) F4-283 Starch by A. E. Staley Manufacturing Co., Decatur, Illinois.

The fructose-dextrose syrup used in this invention ("Isosweet") comprises 29% water and 71% sugars (50% dextrose, 42% fructose, 1.5% maltose, 1.5% isomaltose and 5% higher saccharides). A high fructose-dextrose syrup contains 23.5% water and the remainder is 55% fructose and 45% dextrose. A fructose concentrate is an aqueous syrup having 80% sugar, of which 90% is fructose and the remainder is dextrose.

The corn syrup used has a moisture content of 22.5% and a dextrose equivalent of 29.0 (8.4% dextrose, 14.6% maltose, 8.6% trisaccharides and 68.4% tetrasaccharides and higher) sold under the name Amaizo Lodex C Corn Syrup by American Maize-Products Co., New York, New York.

Soy protein concentrate is prepared from soybean flakes which are extracted with a solvent system wherein the major protein fraction is immobilized and the water-soluble carbohydrates, mineral matter, and other minor constituents are removed. The extracted product is dried and ground. The concentrate is sold under the name Promsoy-100 by Central Soya. Whey protein concentrate is sold under the name Empro-50 which contains 53.6 parts protein and 26.5 parts lactose. A delactosed whey protein may also be used.

Soybean oil type 106 is a 100% soybean oil lightly hydrogenated to an Iodine value of 106.

Hard butter type 106 is a blend of 45% palm kernel oil rearranged with 5% palm oil and 50% palm kernel oil hydrogenated to a Wiley Melting point of 106° F., and having an iodine value of 1.5 maximum.

A standard mixture of mono and di-glycerides is used in many formulations. It is sold under the name Drewmulse 20 by PVO International, Inc., Boonton, New Jersey, and contains about 43% alpha mono content. It has an I.V. of 2.5, a melting point of 140° F. and is manufactured by the glycerolysis of animal or vegetable based fats.

Tenderex emulsifier is a mixture containing polysorbate 60 (11.9%), sorbitan monostearate (31.6%), mono and diglycerides of fatty acids (2.3%), propylene glycol (9.5%) water (44.3%).

The foregoing conventional ingredients may be used in their normal amounts and may vary from the representative amounts and ranges given herein. Food formulations and ranges of ingredients do not readily permit of fixed parameters because of variations in people and places. The following examples are not intended to be limiting, but rather illustrative of some approaches taken and of course which may be varied in accordance with the spirit and scope of this description.

EXAMPLE I

A group of useful products made in accordance with this invention is the oil-in-water emulsion based material used for preparing butter creams, whipped creams, shakes, coffee lighteners, and the like. Butter creams, which can be used as a topping and/or filling for a confectionary product, is typical in several respects of this class of products and the manner in which the problems raised by this type of product have been overcome can readily be adapted to similar types of products.

The conventional butter cream used as a topping or filling by the bakery industry is essentially made of 10–35% shortening, 40–60% sugar, 2–12% water and 1–2% milk powder and/or other emulsions. The creams have poor storage capability and cannot be maintained long at room temperature or even under refrigerated conditions for too long. Because of the inherent limitations in the basic ingredients in the system, it is not feasible to whip in the required amount of air to get the desired mouth feel and texture. Regular butter cream with a specific gravity of 0.6 to 0.75 leaves a greasy feeling in the mouth. Another defect of the butter cream, is the excessive sweetness due to the very high percentage of sugar in the water phase of the product. The high sugar to water ratio also causes a sandy or gritty mouth feel. Butter creams are used in many types of confectionary products which are stored at freezer temperatures, but when a cake decorated with butter cream is frozen, the butter cream becomes hard and has a tendency to crack, peel off, and lead to slipping when used between layers of cake. Similar problems are encountered with conventional butter creams at refrigerator temperatures. A cake with butter cream, when subjected to a normal room temperature of about 70° F. leads to weeping and sagging of the butter cream.

The butter cream, made according to this invention, does not have the above mentioned limitations. The following are some of the features of this product:

It is an oil-in-water type emulsion and can be pasteurized, unlike the conventional butter cream;

The product can be whipped to a specific gravity of about 0.3 to 0.4 and has a very desirable mouth feel and texture;

The whipped product has almost 50% less calories per unit volume because of its lower specific gravity compared to the regular butter cream sold in the trade;

The cost of the whipped product per unit volume is also comparably less than the conventional butter cream;

The product made according to this invention has enhanced stability against microbiological spoilage even when stored at room temperature during the normal shelf life of the baked item, because of the high osmotic pressure exerted by the sugar blends used at the specific concentration in the water phase;

Unlike ordinary butter cream, the consistency of this product can be adjusted by judicious blending of oils so that it can be pumped and whipped in a continuous aerator;

The product's flexibility in consistency also is advantageous in enabling the product to be shipped in tank wagons, which leads to substantial savings in unit packaging and handling;

The type and amount of fat and the sugar blend in this product lead to a product with a marshmallowy texture;

The formulation is compatible with the incorporation of protein concentrate which contains 5-6% crude fiber, which results in an increase in nutritional value in the product and gives special flavor and texture to the product;

The product has the flexibility of permitting replacement of up to 60% of the saturated fat with polyunsaturated fat where special dietary requirements are necessary;

An outstanding feature of the product is that it stays essentially unfrozen or spoonable when used as a filling or topping in a frozen baked product. This keeps the product in a ready-to-eat texture even in the freezer. This also eliminates the normal cracking or peeling of the butter cream in the freezer, and prevents the normal moisture transfer between the cake and its filling which causes sogginess and provides a media for microbial growth after thawing;

The product may be made completely of ingredients of vegetable origin but, if desired, there is flexibility for usage of ingredients of animal origin; and Since the butter cream remains fluid at freezer temperature it can be immediately handled and whipped, unlike conventional formulations which are first brought up to room temperature, then whipped, and finally brought back down to refrigerator or freezer temperatures.

The butter cream is an oil-in-water emulsion comprising about from 25 to 45% water, preferably 30-40% water, sugar in a ratio to water of about from 1-1.5:1 and about from 10 to 30% fat. At the higher ratios, particularly of fructose, a less firm product is obtained which is less suited as a topping but may be used as a filling, i.e. in an eclair. The sugar preferably comprises some fructose, usually in an amount about from 15 to 65% based on the total sugar used. The remainder of the sugar is at least substantially dextrose, i.e. from at least about 50% up to all of the remaining sugar, preferably the total amount of fructose plus dextrose is about from 75 to 100% of the sugar content. The fat preferably contains about from 10 to 60% unsaturated or partially unsaturated fat. Minor amounts of other ingredients are used in about conventional amounts, i.e. protein concentrate, salt, emulsifier, stabilizer and flavoring.

An example of a useful formulation follows.

| Ingredient | Amount |
|---|---|
| (1) Water | 25.32 |
| (2) Dextrose-Fructose Syrup | 36.72 |
| (3) Xanthan Gum | .04 |
| (4) Sucrose | .26 |
| (5) Methocel 65 HG | .26 |
| (6) Soy Protein concentrate | 1.67 |
| (7) Dextrose | 10.57 |
| (8) Salt | .14 |
| (9) Polysorbate 60 | .28 |
| (10) Hexaglyceryl Distearate | .1 |
| (11) Hard Butter | 19.5 |
| (12) Soybean Oil | 5.0 |
| (13) Lecithin | .1 |
| (14) Tenox 22 antioxidant | .01 |
| (15) Flavoring | .03 |
| | 100.00 |

The procedure for making the butter cream formulation was as follows: The sweetener (2) was added to the water (1) and mixed. Components (3) through (6) were premixed and added to the batch and mixed in. Heating of the batch to 180° F. was begun during which the dextrose (7) and salt (8), polysorbate 60 (9) and hexaglyceryl distearate (10) were added. After 180° F. was reached mixing was continued for 5 minutes. Then all but 0.3 parts of the hard butter (11) and all the soybean oil (12) were added. The lecithin (13) and tenox (14) were dissolved in the remaining butter and the mixture was added. The flavoring (15) was then mixed in the mixture and homogenized in two steps at 3000 and 500 psi and the product cooled to 38°-42° F. The finished product can be packed in suitable containers, and stored in a freezer or refrigerator for whipping later.

The water content of the formulation was 35.97% (including the water in the dextrose-fructose syrup). The formulation also contained 10.95% fructose, 23.61% dextrose and 2.35% higher sugars (36.91% total sugar). The product was whipped and had an overrun value of 286%, with a whipping time of about 4 minutes. The specific gravity of the product was 0.35.

The coli count after five days at room temperature was less than ten and the total plate count at that time was less than one hundred—which shows an excellent room temperature stability. It was found that freshly made samples decreased in coli count upon storage at room temperature and had lower counts than refrigerated samples, which in turn had lower counts than frozen samples, i.e. freshly made samples had a coli count of 152. Three samples were held for fourteen days at the indicated temperatures and then had the following coli counts:

| Temperature | Coli Count |
|---|---|
| 70° F. | 7 |
| 40° F. | 53 |
| −7° F. | 133 |

The product was left standing for ten days at room temperature without any evidence of browning (Maillard reaction).

The water activity of the whipped product was 0.875 at 72° F. and its pH was 6.88. It was found that as the sugar/water ratio fell below about one the product quickly lost is microbiological stability and physical integrity. Thus, even at about 45% sugar in the aqueous phase, the coli count and the total plate count increased within two days at room temperature and the butter cream sagged.

This formulation has excellent flow properties at 5° F.—the flow test results were: 300 ml. after 1 minute, 455 ml. after 3 minutes and 570 ml. after 6 minutes. The product when whipped was easily applied to cake as a topping and maintained its physical integrity, texture, and appearance in the freezer during a ten-day test and at room temperature during a seven day test. The butter cream was capable of being whipped at freezer temperatures it was whipped at a temperature as low as minus 30° F.

EXAMPLE 2

A whipped topping made in accordance with this invention has the same advantages as the butter cream discussed in connection with the preceding example. The whipped topping has less hard butter and a higher unsaturated fat content than the butter cream formulation; the ingredients are otherwise equivalent. The product retains its texture at freezer temperatures and is microbiologically stable. This product also has the property of being whipped at freezer temperature rather than requiring the expensive and time consuming technique of first taking it to room temperature, whipping it and then cooling it.

The whippable topping of this invention and the whipped product made from it comprises an oil-in-water emulsion having about from 25 to 45% water, preferably about from 30-40% water, sugar in a ratio to water of about from 1-1.5:1, and about from 10 to 30% fat. The quantities of each type of sugar and fat may be the same as in the butter cream formulation, however in the whipped topping, generally higher amounts of unsaturated fats are used, i.e. 40% or more unsaturated fat and up to about 60% based on the total fat content. Although unsaturated fats have been considered to have an adverse effect on the stability of protein-containing foams it has been found that this combination of ingredients is suitable for the whipped products described in this specification. Conventional additives are also used in this formulation. Variations in the ingredients and their amounts guided by the foregoing can be accomplished in accordance with principles well-known in the art—see for example "The Role of Ingredients In the Formulation of Whipped Toppings" by W. H. Knightly, Food Technology, Vol. 22, pp. 73–86, June 1968.

A ready-to-whip cream base was prepared from the following components.

| Ingredient | Amount |
| --- | --- |
| (1) Water | 25.22 |
| (2) Dextrose-Fructose Syrup | 36.72 |
| (3) Xanthan Gum | .04 |
| (4) Sucrose | .26 |
| (5) Methocel 65 HG | .26 |
| (6) Soy Protein Concentrate | 1.67 |
| (7) Dextrose | 10.57 |
| (8) Salt | .14 |
| (9) Polysorbate 60 | .28 |
| (10) Hexaglyceryl Distearate | .10 |
| (11) Hard Butter | 9.50 |
| (12) Corn oil | 15.00 |
| (13) Tenox 22 antioxidant | .01 |
| (14) Lecithin | .10 |
| (15) Flavoring | .03 |
| (16) Potassium Sorbate | .10 |
| | 1000.00 |

The procedure for making the topping formulation was the same as that described for the butter cream. The formulation was placed in a freezer with a conventional Whip Topping (unwhipped) until equilibrium was reached. The topping of this invention flowed readily when frozen, as follows: 115 ml. in 1 minute, 210 ml. in 3 minutes, 310 ml. in 5 minutes, 400 ml. in 10 minutes and 435 ml. in 15 minutes. The conventional whip topping did not flow at all in 15 minutes. The Whip topping formulation of this invention after being whipped and frozen had a penetrometer value of 10.1 mm. A conventional topping (Rich's pre-whip) had a penetrometer value of 6.5 mm. The product had a water activity of 0.875 (at 71° F.) and a pH of 6.62. The product had a polyunsaturated to saturated ratio (P/S) of 0.74 (based on corn oil having a saturated content of 14% and a polyunsaturated content of 57%, and hard butter being 100% saturated). A P/S of 0.38–0.74 is useful.

The formulation was whipped rapidly to an overrun of 256%. The whipped product had a light and smooth texture which was retained at freezer temperature.

EXAMPLE 3

A low-fat whipped cream having the same benefits as the foregoing butter cream and whipped topping was prepared. This product, as indicated, is low in fat content, but retains an excellent texture over a wide range of temperatures.

This low fat whipped cream is a microbiologically stable oil-in-water emulsion which contains about from 10 to 15% fat, about from 25 to 45% water, preferably about from 30-40% water, and sugar in a ratio to water of about from 1-2:1. The fat content is preferably about from 10 to 25% unsaturated fat.

The amount of fructose plus dextrose equals at least 50% and up to 100% of the total sugar, with the fructose being from about 15 to 65% of the total sugar.

A low-fat ready-to-whip base was made as follows:

| Ingredient | Amount |
| --- | --- |
| (1) Water | 19.22 |
| (2) Corn Syrup | 25.76 |
| (3) Dextrose-Fructose Syrup | 30.68 |
| (4) Xanthan Gum | .04 |
| (5) Sucrose | .26 |
| (6) Methocel 65 HG | .26 |
| (7) Soy Protein Concentrate | 1.66 |
| (8) Dextrose | 10.52 |
| (9) Salt | .14 |
| (10) Polysorbate 60 | .28 |
| (11) Hexaglyceryl Distearate | .10 |
| (12) Hard Butter | 9.45 |
| (13) Tenox 22 antioxidant | .5 |
| (14) Soybean Oil | 1.0 |
| (15) Lecithin | .1 |
| (16) Flavoring | .03 |
| | 100.00 |

This product was made by the procedure set forth in Example 1. It had a total water content of 33.91% (including the water in the corn syrup and in the dextrose-fructose syrup). The whipped cream has 9.15% fructose, 23.09% dextrose and a total sugar content of 52.53%.

The mixture, which had a pH of 6.5, was whipped promptly after being made. An overrun 273% was obtained in a whipping time of 3½ minutes to give a marshmallow type product with a specific gravity of 0.36. It was spoonable at freezer temperature and pourable at refrigerator temperature. A similar formulation with 10.45% hard butter instead of the above combination of saturated-unsaturated fat did not have the pourable consistency of the formulation of this example, but was still spoonable. A second sample of the formulation was frozen, held for four days, thawed and whipped. An overrun of 290% was obtained with a whipping time of 4 minutes.

The product was used on a cupcake and in a layer cake with satisfactory results.

EXAMPLE 4

A milk mate product was prepared in accordance with this invention. It is adapted to be maintained in a freezer without hardening so that upon removal it can be mixed immediately and readily with milk. Since the milk mate remains soft, it can be spooned into milk and stirred to prepare a thick drink. The milk mate can be formulated with a vitamin mix which is stabilized by maintaining the product in the freezer.

The milk mate product is an oil-in-water emulsion comprising about from 25 to 40% water, sugar in a ratio to water of about from 1-1.5:1, and from about 10 to 25% fat. The fat content is preferably at least 50% and up to 100% unsaturated to provide better flow properties and greater nutrition. The sugar preferably comprises some fructose such as about from 15 to 65% of the total sugar content, and the amount of fructose plus dextrose equals about from 50 to 100% of the sugar. A minor but effective amount of vitamins in any standard mix may also be added in addition to conventional ingredients such as: flavoring (cocoa, vanilla), emulsifiers, salt and stabilizers.

The milk mate product can be mixed in varying amounts with milk, for example, about from 20 to 100 parts of milk mate to 200 parts of cold milk.

An example of a milk mate product is:

| Ingredient | Amount |
| --- | --- |
| (1) Water | 21.26 |
| (2) $K_2HPO_4$ | .14 |
| (3) Sodium Acid Pyrophosphate | .02 |
| (4) Soy Protein Isolate | .50 |
| (5) Sucrose | 20.96 |
| (6) Dextrose-Fructose Syrup | 30.05 |
| (7) Cocoa | 6.99 |
| (8) Salt | .50 |
| (9) Polysorbate 60 | .30 |
| (10) Sodium Stearoyl-2 Lactylate | .30 |
| (11) Mono and Di-Glycerides | .40 |
| (12) Soybean Oil | 17.97 |
| (13) Potassium Sorbate | .10 |
| (14) Vanilla | .01 |
| (15) Color | .20 |
| (16) Vitamin Mixture | .30 |
| | 100.00 |

This product has 30.04% water (including the water from the syrup and vitamin mix) and 42.30% sugar. The vitamin mixture was ⅔ water and the remainder a mixture of vitamins A, $B_1$, $B_2$, $B_6$, C, D and E.

The procedure to make the milk mate was as follows: Melt the emulsifiers (9-11) in a container and add them to the soybean oil which was heated to 120° F.—and hold unti ready to use. Heat the water to 150° F. in a kettle and add ingredients 2 through 8. Add the oil-emulsifier blend to the remaining ingredients and mix for one minute. Homogenize at 3000 and 500 psi and cool to 40° F.

The product had a water activiy of 0.88, measured at 72° F. The product flowed readily after storage in a freezer. The flow test results were: 55 ml. in one minute, 230 ml. in 5 minutes and 365 ml. in 15 minutes—by which time the product reached 16° F.

The product mixed well with cold milk immediately upon removal from the freezer. A drink was made with 30 gms. of the milk mate and 210 gms. cold milk. The flavor and body were good, and remained so after being held at 40° F. for four days.

EXAMPLE 5

A non-dairy shake similar to a milk shake was prepared which at freezer temperature was free flowing and soft both before and after whipping. Moreover, it could be whipped without first defrosting it. The shake can be made with a variety of flavors and like the other products of this invention is microbiologically stable.

The shake comprises about from 35 to 45% water, sugar in a ratio to water of 1-1.5:1, and 3 to 10% fat. The sugar comprises a substantial amount of fructose and based on the total sugar content, the fructose content is about from 15 to 65%, preferably 20 to 50%. The remaining sugar is substantially dextrose, i.e., 50 to 100% of the remaining sugar, preferably the total amount of fructose plus dextrose is about from 75 to 100% of the sugar content. The fat content is preferably about from 50 to 100% unsaturated. The product also contains a whey protein concentrate or other protein concentrate to improve whipping properties and nutritional values, conventional amounts of stabilizers, such as xanthan gum or cellulose esters, salts, emulsifiers, and flavoring are also used.

The following is a suitable formulation for a shake:

| Ingredient | Amount |
| --- | --- |
| (1) Water | 30.00 |
| (2) High Fructose - Dextrose Syrup | 52.29 |
| (3) Xanthan gum | .04 |
| (4) Methocel 65 HG | .26 |
| (5) Sucrose | 1.87 |
| (6) Dextrose | 2.40 |
| (7) Whey protein concentrate | 8.00 |
| (8) Polysorbate 60 | .28 |
| (9) Hexaglyceryl Distearate | .10 |
| (10) Soybean Oil | 4.50 |
| (11) Lecithin | .10 |
| (12) Salt | .10 |
| (13) Vanilla | .05 |
| (14) Strawberry Flavor | .01 |
| | 100.00 |

The product has a total water content of 42.29% and a sugar content of 46.39% (22% fructose, 20.4% dextrose and 3.99% other sugars, based on the total composition).

The product is made by mixing the syrup (2) with cold water (1) and adding in a premix of ingredients 3 to 5 with stirring until completely dissolved. The solution is heated to 180° F. and ingredients 6 through 9 are added and dissolved, after which the solution is held at that temperature to 5 minutes. A warmed blend of the soybean oil and lecithin are added and then the remaining ingredients, and mixing is continued for one minute. The product is homogenized at 3,000 and the 500 psi and finally cooled to 40° F.

The product was placed in a freezer for 24 hours and upon removal was found to remain very fluid—it has a flow rate of 600 ml. in 30 seconds.

The product after whipping also had excellent flow properties at freezer temperatures—460 ml. after one minute, 545 ml. after three minutes. A conventional milk shake (McDonald's) was tested under the same conditions but failed to flow at all over a fifteen minute period. When dextrose was substituted for the high fructose-dextrose syrup in the formulation of this example the whipped product at 5° F. would not flow even after 15 minutes. But when one-half of the syrup was replaced by an equal weight of dextrose, the whipped product showed some flow—up to five minutes no flow, 25 ml. after 10 minutes, 35 ml. after 12 minutes and 60 ml. after 15 minutes.

EXAMPLE 6

A non-dairy coffee creamer was made which can be stored in a freezer until ready for use, and then immediately used or left at room temperature for at least about ten days without spoiling until used. The product may also be left in a refrigerator for a lengthy period of time without spoilage. This product is useful as a coffee lightener and sweetener.

The coffee lightener comprises about from 35 to 45% water, sugar in a ratio to water of about from 1-1.5:1, about from 10 to 30% fat. The sugar content may be all dextrose, but from 15 to 55% of the sugar content may be fructose with the remainder being substantially dextrose. Preferably the total of the fructose and dextrose is about from 75 to 100% of the sugar. The fat preferably comprises from 50 to 100% unsaturated type fats. Other ingredients are included in conventionally minor amounts, such as salts, emulsifiers and a protein concentrate.

An example of a suitable formulation is:

| Ingredient | Amount |
|---|---|
| (1) Water | 23.72 |
| (2) $K_2HPO_4$ | .14 |
| (3) $Na_2HPO_4$ | .14 |
| (4) Sodium acid pyrophosphate | .02 |
| (5) Soy protein isolate | .50 |
| (6) Polysorbate 60 | .30 |
| (7) Sodium Stearoyl Lactylate | .30 |
| (8) Mono and Di-Glycerides | .40 |
| (9) Fructose-Dextrose Syrup | 56.48 |
| (10) Soybean | 16.00 |
| (11) Coconut oil | 2.00 |
| | 100.00 |

The product contains a total of 40.1% water and 40.1% sugar (which includes 16.84% fructose, 20.05% dextrose and 3.21% higher sugars).

The product was made as follows:

Heat the coconut oil to 155° F. and dissolve in the emulsifiers, ingredients 6 through 8; the foregoing is added to the soybean oil. The water is heated to 150° F. and the salts 2 through 4 and protein 5 are added. The syrup 9 is added to the aqueous solution, which is then held at 170° F. for one minute, after which the oil blend is added. The entire batch is homogenized at 3,000 and then 500 psi and cooled to 40° F.

The product's flow characteristics at freezer temperatures were zero flow at one minute, 20 ml. at three minutes, 220 ml at five minutes and 600 ml at seven minutes. The same formulation in which dextrose replaced the fructose did not flow but was a semi-solid when held at 5° F. for three days.

The formulation given above had a water activity value of 0.9 measured at 72° F., and upon storage at 40° F. for thirty-two days maintained its stability and did not exhibit any off-flavor. The product also maintains its stability at room temperature for many days.

EXAMPLE 7

A microbiologically stable cake batter and cake and other bakery products were made which retain their characteristic texture at freezer temperature. The cake batter is suitable for industrial and home use where stable storage is an important factor. The batter can be kept in a freezer and is always ready for use. The cake of this invention is particularly suited for the expanding convenience frozen food market. It can be cut and served promptly upon removal from the freezer. The cake, of course, can be made with fillings and toppings described above which likewise retain a soft texture and are microbiologically stable.

The cake batter comprises about from 20 to 30% water, sugar in a ratio to water of about from 1–1.5:1, and preferably about from 2.5 to 10% fat, and up to 25% fat. The sugar preferably includes fructose in an amount about from 10 to 40% based on the sugar content with the remainder being substantially dextrose (50–100%). The type of fat can be varied widely between saturated and unsaturated depending on the type of cake and texture desired. An unsaturated fat will provide superior flow and nutritional properties. Other conventional ingredients are used in their normal proportions such as egg whites, nonfat milk solids, flour, emulsifiers or softeners such as glyceryl monostearate, salt, preservative, coloring and flavoring.

A cake batter was made from the following:

| Ingredient | Amount |
|---|---|
| (1) Water | 15.0 |
| (2) Egg White (88% water) | 8.75 |
| (3) Sugar (12x) | 8.75 |
| (4) Dextrose | 18.75 |
| (5) Fructose-Dextrose Syrup | 15.0 |
| (6) Tenderex emulsifier | 1.4 |
| (7) Baking Powder | 1.3 |
| (8) Vegetable Oil | 2.5 |
| (9) Vanilla | .2 |
| (10) Salt | .72 |
| (11) Coloring | .13 |
| (12) Nonfat milk solids | 2.5 |
| (13) Cake Flour | 25.0 |
| | 100.00 |

The water content of the batter is 27.67% and the sugar content is 38.15% (fructose 4.47%, dextrose 24.08% and other sugars, 9.6%).

The water (1), egg whites (2), and sugars (3 through 5) are mixed thoroughly. The emulsifiers (6), baking powder (7), vegetable oil (8) and vanilla (9) are added and mixed in until uniform. The remaining ingredients (10 through 13) are then mixed in.

The batter was frozen and then tested on a penetrometer; it had a value of 19.8 compared to a conventional batter which gave a reading of 4.1. A cake made from this batter was frozen and it gave a penetrometer reading of 6.9 compared to a value of 4.2 for a conventional cake. The cake had a moisture content of 25.2%.

The cake was topped with a butter cream made by the procedure of Example I. The finished cake was placed in the freezer for a day and then removed. The topping and cake retained their texture and could be eaten immediately.

EXAMPLE 8

A further formulation was developed for a cake batter which was particularly adapted for sale from supermarket freezers for the ultimate consumer who would bake and consume the product. This batter has excellent flow properties at freezer temperatures. It can be used immediately upon removal from the freezer and then whatever batter remains can be returned to the freezer for storage. The product lacks conventional chemicals, preservatives, and emulsifiers found in cakes since the batter is designed for use by the ultimate consumer who will make and, without any great interval of time, consume the cake. The batter of this formulation, has the additional optional advantage of making a cake which will retain its soft and edible texture at freezer temperature. This batter is also suitable to make other products, such as pancakes and the like.

The batter comprises about from 20 to 40% water, preferably from 25 to 30% water, sugar in a ratio to water of about from 1–1.5:1, and about from 5 to 25% fat, preferably about from 8 to 12% fat. The sugar content preferably includes fructose in an amount about from 10 to 40%, with the remainder being substantially dextrose, i.e. about 50 to 100% of the remainder.

The batter formulation was as follows:

| Ingredient | Amount |
|---|---|
| (1) Water | 10.3 |
| (2) Egg White (88% Water) | 10.0 |
| (3) Dextrose | 9.7 |
| (4) Fructose-Dextrose Syrup | 30.0 |
| (5) Baking Powder | 2.0 |
| (6) Vegetable Oil | 10.0 |
| (7) Vanilla | .1 |
| (8) Salt | .4 |

| Ingredient | Amount |
|---|---|
| (9) Nonfat Milk Solids | 2.5 |
| (10) Cake Flour | 25.0 |
| | 100.0 |

The water content of the batter is 25.4% and the sugar content is 31% (fructose 8.95%, dextrose 20.35% and other sugars 1.7). The product was made by the procedure of example 7. The batter was frozen and then tested for its flow properties with the following results (obtained at the indicated temperatures): 190 ml. at 1 minute (10° F.), 425 ml. at 3 minutes (20° F.), 480 ml. at 5 minutes (22° F.) and 575 ml. at 10 minutes (28° F.).

EXAMPLE 9

A pancake batter can be made in accordance with the present invention which is sufficiently free-flowing at freezer temperatures to be poured or squeezed from a container. The product can be maintained indefinitely in a freezer and upon removal from the freezer can be poured, without defrosting, onto a griddle to make pancakes in the conventional manner. The pancakes made from the batter can be frozen and stored indefinitely but will remain soft as freezer temperature. The pancakes therefore can be used directly from the freezer by quickly warming them, unlike conventional frozen pancakes which need to be defrosted or subjected to extensive heating to soften them throughout. The pancakes and waffles can be stored at room temperature or at refrigerator temperature for many days without spoilage.

The pancake batter of this invention comprises about from 15 to 45% water, but preferably about from 30 to 40% water, sugar in a ratio to water about from 1–1.5:1, about from 2.5 to 10% fat, minor amounts of conventional salts and leavening agents and other conventional additives and the remainder flour and usually an egg product and/or a milk product. The wide choice of flours available for ordinary pancakes is applicable for this invention, such as the bread flour shown below or a combination of wheat flour, bleached or unbleached, with a minor amount of corn flour and/or rice flour. The foregoing amounts can of course be varied as desired in accordance with the known properties of the ingredients and as further explained in this specification to maintain the desirable properties of the product. It is preferred that the sugars used be substantially low molecular weight. For example, about from 10 to 40% of the sugar can be fructose with about from 50 to 100% of the remainder of the sugar in the formulation being dextrose. A small part of the sugar used may be replaced by an amount of polyhydric alcohols sufficient to provide an equivalent osmotic effect, such as glycerol (see U.S. Pat. No. 3,753,734). Edible oils or shortenings may be used; preferably an unsaturated fat. A pancake batter formulation was made from the following ingredients in the indicated amounts.

| Ingredients | Amount |
|---|---|
| (1) Liquid Egg White | 32.26 |
| (2) Dextrose-Fructose Syrup | 19.42 |
| (3) Salt (NaCl) | 0.58 |
| (4) Dextrose | 20.33 |
| (5) Bread Flour | 19.42 |
| (6) Sodium Acid Pyrophosphate | 0.82 |
| (7) Sodium Bicarbonate | 0.60 |
| (8) Soybean Oil, Type 106 | 6.47 |
| | 100.00 |

The liquid egg white comprises 87.6% water and this in combination with the 29% water content of the Dextrose-Fructose Syrup gave a total water content of 33.98%. The fructose content of the formulation was 5.79%, and the dextrose content was 27.22%, whereas the total sugar content of the batter was 34.11%.

The batter was made by adding the liquid egg whites to a Norman mixer, adding the salts (3) and (6), metering in the dextrose-fructose syrup with agitation, adding the dextrose (4) and bread flour, increasing the mixer rate to high speed, adding the soybean oil, finally adding the sodium bicarbonate and mixing all ingredients for five minutes. The formulation is then pumped to a cooled hold tank from which it is passed through a votator to cool it to 25°–28° F., from which it is pumped to another cooled holding tank.

Pancakes were made from this formulation on a greased and covered griddle, frozen and tested on a penetrometer against pancakes made from a conventional batter. The frozen pancake made from the formulation of this invention gave a penetrometer reading of 5.1mm whereas the frozen standard pancake gave a reading of 1.1mm. The pancake had a moisture content of 25.2%.

This formulation flows at about 20° F. The flow properties of this formulation and the other batters of this invention could be improved by using encapsulated sodium bicarbonate and sodium acid pyrophosphate to prevent the evolution of gases until heat is applied. This technique would be applied where a more fluid mixture is desired, because the evolution of carbon dioxide from the leavening agents in the produt has a thickening effect. The encapsulation technique is also important where long-term storage stability is required. The foregoing batter is equally useful for making waffles and the like, although it is often desirable, particularly for waffles, to increase the fat content to twice that of pancakes to prevent adhesion to the baking grid.

By controlling the amount of sugar in the pancake batter the final product can be made sufficiently sweet so that a syrup or other sweetener is unnecessary. Moreover, in view of the high sugar content the addition of a small amount of water onto the finished pancake will produce a syrup-type topping as the water adsorbs sweetener and flavoring from the pancake. A maple or butter flavor may be added to the pancake to enhance this effect.

EXAMPLE 10

A donut batter and donut were made by the procedures of this invention. These have the properties of the batters and bakery products previously discussed. A particularly useful product is a donut with a filing and/or topping made in accordance with this invention. The flexibility of the donut batter enables the user to shape it upon removal from the freezer. The ability to store the donut at freezer temperature provides for its long-term stability while maintaining it in a ready to eat condition.

The donut batter comprises about from 15 to 30% water, sugar in a ratio to water about from 1–1.5:1; and about from 2 to 10% fat. The sugar preferably includes some fructose, for example, about from 10 to 40% of the total sugar may be fructose, and about from 50 to 100% of the remaining sugar is dextrose. The fat is preferably unsaturated. The batter also includes salts, flavoring and flour.

An example of a donut batter formulation is

| Ingredient | Amount |
| --- | --- |
| (1) Ginger | .19 |
| (2) Nutmeg | .14 |
| (3) Xanthan Gum | .05 |
| (4) Calcium Phosphate | .81 |
| (5) Ferric Orthophosphate | .03 |
| (6) Magnesium Phosphate | .29 |
| (7) Whole Egg Powder | 1.29 |
| (8) Sodium Acid Pyrophosphate | .61 |
| (9) Sodium Bicarbonate | .44 |
| (10) Salt | .57 |
| (11) Bread Flour | 28.17 |
| (12) Cake Flour | 4.78 |
| (13) Corn Oil | 3.82 |
| (14) Coloring | .01 |
| (15) Egg White (88% water) | 23.9 |
| (16) Dextrose | 11.0 |
| (17) Fructose-Dextrose Syrup | 23.9 |
| | 100.00 |

The amount of water in the formulation was 27.96% and the amount of sugar was 27.96% (7.13% fructose, 19.48% dextrose, and 1.36% higher sugars).

The batter was made by placing the egg whites (15) into a Hobart mixer, adding the dextrose (16) and dispersing it completely with the paddle mixer, and then adding the syrup (17) and mixing thoroughly. A premix of ingredients (1) through (14) were then added and mixed first at low speed for a minute and then at medium speed for two minutes. After standing for ten minutes the donuts were fried in the conventional manner. A partially hydrogenated shortening having an iodine value of 70 was used—and the donut absorbed close to 20% shortening.

The donut was placed in a freezer for 24 hours at −7° F. and upon removal it was immediately edible. The penetrometer reading was 3.1mm compared to a conventional donut which had a value of 1.7; after standing at room temperature for fifteen minutes the donut made as described above had a penetrometer reading of 6.3 whereas the conventional donut had a value of 2.8. These figures are significant in view of the fact that frying the donuts leads to a crisp and firm shell with a softer interior.

EXAMPLE 11

Sour cream and sour cream-based products normally must be consumed fairly soon after purchase because of their short shelf life, even at normal refrigerator temperatures of 40° F. to 50° F. It is difficult to freeze these products because of the formation of ice crystals within the product which tend to break down its structure and texture. Various substitutes have been developed for these sour cream products but none has been completely acceptable in texture and stability.

In accordance with the present invention, a sour cream dressing was made which will remain spoonable at freezer temperature and which is microbiologically stable at room temperature. Since this product must have a sour taste it is desirable to reduce and preferably eliminate the sweetest sugar (fructose) in the formulation, and preferably to use an unsaturated fat.

The sour cream dressing formulation comprises about from 30 to 40% water, sugar in a ratio to water about from 1-1.5 to 1 and about from 10 to 30% fat, preferably about from 15 to 25% fat. The sugar used is substantially all dextrose, with up to about 10% of the formulation being fructose and up to about 10% of the formulation being other sugars. A high ratio of sugars to water should be used to contribute to the fluidity of the formulation at low temperature when fructose is not used. The fat used may be saturated or unsaturated, but preferably from half to all of the fat is unsaturated. A minor amount of acid is used, such as about 1 to 2% or more to provide some tartness to the formulation which has a sweet flavor from the sugar present. Other conventional ingredients are used in their normal amounts such as salt, stabilizers and emulsifiers; see for example U.S. Pat. No. 3,729,322.

A sour cream dressing formulation was made from the following ingredients in the indicated amounts.

| Ingredients | Amount |
| --- | --- |
| (1) Dextrose | 44.14 |
| (2) Water | 31.88 |
| (3) Maize Starches | 1.72 |
| (4) Non-Fat Dry Milk | 2.87 |
| (5) Sodium Stearoyl-2 Lactlylate | .49 |
| (6) Xanthan Gum | .25 |
| (7) Sodium and Calcium Alginate | .25 |
| (8) Titanium Dioxide | .10 |
| (9) Dipotassium Phosphate | .39 |
| (10) Salt (NaCl) | .20 |
| (11) Soybean Oil-Type 106 | 15.83 |
| (12) Adipic Acid | .20 |
| (13) Citric Acid | .10 |
| (14) Sorbic Acid | .05 |
| (15) Lactic Acid | .35 |
| (16) Vinegar (110 grain) | .68 |
| (17) Polaks Flavor #540191 | .50 |
| | 100.00 |

The procedure to make the product was as follows: measure hot tap water in Norman Blender; add pre-blend and mix for 3 minutes (the pre-blend contained all of the dry materials); add soybean oil, flavor, acids, and vinegar; mix for 10 minutes at high speed; use a double-barrel votator to cook to 190°–200° F. for approximately 5 seconds; homogenize at 2000 psi first stage and 500 psi second stage; use the same twin-shell votator (swept surface cooker-cooler) to cool to 60° F.; fill in containers and freeze.

At −5° F. the product was spoonable. The freezer flow test showed: virtually no flow at 3 minutes; 2 ml. at 5 minutes; 4 ml. at 10 minutes and 6 ml. at 15 minutes. A penetrometer test at freezer temperature gave a value of 25.2 mm; whereas a commercially available control sample (Rich's sour) gave a penetrometer reading of 1.3 mm. Thus the sour cream dressing can be used immediately upon removal from the freezer with a softness and flowability for easy application to other foods or for direct eating.

EXAMPLE 12

Puddings made in accordance with the present invention are useful as a ready-to-eat convenience food which can be packaged in any conventionally used container for storage in a freezer; the pudding retains its soft texture at freezer temperature and is microbiologically stable at room temperature. Unlike canned puddings, the pudding of this invention does not require sterilization and expensive packaging and unused portions may be left in the refrigerator, or even at room temperature, for subsequent use. And, unlike conventional frozen puddings, the present pudding does not crystallize and harden with consequent loss of texture, nor is the inconvenience of defrosting necessary before the pudding can be eaten.

The puddings of this invention comprise an oil-in-water emulsion having about from 30 to 40% water, sugar in a ratio to water of 1-1.5 to 1 and from about 15 to 25% fat. When the sugar does not contain fructose and the fat is saturated, the product tends to a somewhat cohesive consistency and the sugar to water ratio is maintained toward the upper range. The amount of dextrose plus fructose is preferably about 70 to 100% of the sugar content. The use of unsaturated fats, such as soybean oil, would be desirable for flow and nutritional properties. Minor amounts of conventional stabilizers, emulsifiers and flavors are also used.

A pudding was made from the following ingredients in the indicated amounts.

| Ingredient | Amount |
| --- | --- |
| (1) Pudding emulsion | 66.29 |
| (a) water | 31.72 |
| (b) polysorbate 60 | .20 |
| (c) guar gum | .07 |
| (d) sorbitan monostearte | .13 |
| (e) sodium caseinate | .86 |
| (f) dextrose | .66 |
| (g) sucrose | 14.72 |
| (h) hard butter | 5.30 |
| (i) coconut oil | 12.60 |
| (j) potassium sorbate | .03 |
| | 66.29 |
| (2) Dextrose | 33.14 |
| (3) Sodium Alginate | .23 |
| (4) Vanilla Flavor | .11 |
| (5) Calcium Chloride | .23 |
| (10% Solution) | |
| | 100.00 |

The pudding emulsion (ingredients (a) through (j)) is a conventional product made by heating the water (a) to 140° F. adding the remaining ingredients, heating the solution to 155° to 160° F., homogenizing in two steps at 7000 and 500 psi and cooling to 34°-38° F. The pudding formulation of this invention was made by premixing the dextrose (2) and sodium alginate and adding them to the standard pudding emulsion at 150° F., the remaining ingredients, (4) and (5), are then added.

The product had a slightly elastic character and at −7° F. a penetrometer value of 29.3 mm, compared to a commercially available pudding (Rich's Chocolate Pudding) which gave a penetrometer reading of 1.3mm. The water activity of the pudding averaged 0.852 at 73° F.

EXAMPLE 13

A yogurt type product, an acidophilus pudding, was made to have the properties of the pudding described in Example 12.

The acidophilus pudding comprises about from 25% to 40% water, sugar in a ratio of water from 2-1:1, and about from 3 to 15% fat. The amount of fructose and dextrose total about 50 to 100% of the sugar content.

A suitable formulation is:

| Ingredient | Amount |
| --- | --- |
| (1) Pudding emulsion | 50.00 |
| (2) Dextrose | 32.50 |
| (3) Sodium Alginate | .20 |
| (4) Fructose-Dextrose Syrup | 15.00 |
| (5) Lactobacillus Acidophilus Culture | 2.00 |
| (6) Calcium Chloride (10% sol'n) | .26 |
| (7) Butter Milk Flavor | .04 |
| | 100.00 |

The pudding emulsion (1) used as an ingredient was the same as that described in Example 12.

The product was made by premixing the dextrose (2), syrup (4) and sodium alginate (3), adding it to the pudding emulsion (1) at 150° F., cooling to 40° F. and adding the remaining ingredients (5) through (7). It comprised 28% water and 54.75% sugar.

The product was frozen overnight and immediately upon removal was found to be spoonable, whereas a conventional yogurt (Dannon) was hard and required defrosting before eating.

EXAMPLE 14

A gelatin-type pudding was made to have the properties of maintaining its texture at freezer temperatures and being microbiologically stable at room temperature.

The product comprises about from 40 to 50% water, sugar in a ratio to water about from 1-1.5 to 1, and a gel former. The sugar is of low molecular weight—substantially dextrose and/or fructose in an amount totaling about from 75 to 100% of the sugar content.

An example of a formulation is

| Ingredient | Amount |
| --- | --- |
| (1) Water | 49.40 |
| (2) Dextrose | 50.00 |
| (3) Sodium Alginate | .25 |
| (4) Color | .05 |
| (5) Flavoring | .05 |
| (6) Calcium Chloride (10% sol'n) | .25 |
| | 100.00 |

The product was made by premixing the dextrose and sodium alginate and adding it to the water which was heated to 150° F., after which the remaining ingredients were added.

The product was placed in a freezer overnight at −7° F. and immediately upon removal was spoonable, with a penetrometer reading of 10.3mm. A conventional gelatin-type pudding (Jell-O brand) was hard and gave a reading of 0.7mm under the same conditions.

EXAMPLE 15

A cocktail sauce for shrimps was made to have the characteristics of remaining edible at freezer temperature and of being microbiologically stable at room temperature. The shrimps themselves may be made in accordance with the technique of infusing fish products with a high solutes contents to impart microbiological stability and tenderness at freezer temperatures.

The sauce of this invention comprises about from 35 to 45% water, sugar in a ratio to water about from 1-1.5:1. The sugar comprises substantially dextrose and fructose as 70 to 100% of the total sugar content. The fructose content may be about from 10 to 30% of the sugar content. In addition, conventional ingredients such as ketchup (or other tomato product), horseradish, salt and flavoring are added.

A sauce of the following composition was made.

| Ingredient | Amount |
| --- | --- |
| (1) Ketchup | 41.877 |
| (2) Water | 10.10 |
| (3) Horseradish | 4.90 |
| (4) Starch (Instant) | .75 |
| (5) Lemon Juice Concentrate | .31 |
| (6) Salt | 1.92 |
| (7) Black Pepper | .003 |
| (8) Hot Sauce | .27 |

-continued

| Ingredient | Amount |
| --- | --- |
| (9) Dextrose | 23.92 |
| (10) Fructose-Dextrose Syrup | 15.95 |
| | 100.00 |

The ketchup has about 68.0% water and 12% sugar—such as sucrose. The sauce is made by mixing together ingredients (1) through (8) until uniform. The mixture is then heated to 160° F. and held at that temperature while mixing in the dextrose (9) and syrup (10) at medium speed for 10 minutes. Three parts of the sauce to one part of treated shrimp are mixed together for the final product.

The shrimp may be treated to lower its moisture content below 50% and to add solutes comprising sugars, polyhydric alcohols and salts to lower the water activity of the shrimp to 0.90 and below, i.e., to 0.75. This can be carried out by cooking or subsequently immersing the shrimp in a stabilizing solution having a concentration of water soluble compounds sufficiently high to effect the desired transfer of solute and lowering of water activity—usually under an elevated temperature and pressure. For example, in one procedure the shrimps were placed in the following solution, which was brought to boiling temperature and then let stand at room temperature overnight.

| Ingredient | Amount |
| --- | --- |
| Water | 47.4 |
| Propylene Glycol | 44.3 |
| Sodium Chloride | 7.4 |
| Potassium Sorbate | 0.9 |

These shrimps were placed in the freezer overnight and when removed were soft and ready to eat. An alternative procedure is to use the same technique with a shrimp flavored fructose-dextrose syrup having about 5 to 10% salt.

The cocktail sauce had a penetrometer reading of 22.4 mm. A conventional frozen cocktail sauce (Kitchen's Of The Oceans, Inc.—Dearfield Beach, Florida) tested under the same conditions gave a penetrometer value of 6 mm.

EXAMPLE 16

Frozen clam chowder concentrate as presently marketed is usually defrosted before use. Otherwise it is difficult to remove from the can and if removed from the can and placed while still solid in boiling water or a hot pot it sinks to the bottom of the pot and may be scorched. In accordance with the present invention a clam chowder concentrate can be made which will flow at freezer temperature. This product is easily removed from its container and mixed with water or milk to make the final product.

The clam chowder concentrate contains about from 30 to 45% water, sugar in a ratio to water about from 1-1.5:1, and about from 5 to 30% fat (saturated or unsaturated). The sugar content preferably includes about from 10 to 40% fructose and the fructose plus dextrose content is about from 75 to 100% of the total sugar. The formulation includes a standard mixture of finely chopped vegetables, a stabilizer like cornstarch, salt, spices, and flavorings. Other conventional ingredients can be added, such as milk solids.

A clam chowder concentrate was made from the following ingredients in the amounts listed.

| Ingredient | Amount |
| --- | --- |
| (1) Margarine | 7.32 |
| (2) Potato (finely chopped) | 4.05 |
| (3) Celery (finely chopped) | 5.03 |
| (4) Onion (finely chopped) | 2.81 |
| (5) Mushrooms (finely chopped) | 2.23 |
| (6) Garlic (finely chopped) | .07 |
| (7) Cornstarch | 1.31 |
| (8) Stewed tomatoes | 22.68 |
| (9) Salt | .23 |
| (10) Black Pepper | .03 |
| (11) Worcestershire Sauce | .78 |
| (12) Sherry Wine | .78 |
| (13) Fructose-Dextrose Syrup | 20.05 |
| (14) Dextrose | 32.63 |
| | 100.00 |

The product is made by melting the margarine (1) and adding the vegetables, (2) through (6) to sauté them. Alternatively the vegetables can be infused with solutes to control their stability and texture, in accordance with the procedure set forth in example 15. The salt (9) and pepper (10) are added. Separately dissolve the cornstarch (7) in the stewed tomatoes (8), add to the sauteed mixture and simmer until thickened. The worcestershire sauce (11) and sherry (12) are added and simmering is continued for five to seven minutes. Add the desired amount of infused clams (i.e. about 25%) and simmer for five minutes more. The clams may be treated with the same solutions used in the process set forth in example 15. Finally add the sugars (13) and (14), and mix well for ten minutes.

This product had a moisture content of 42.03% and a sugar content of 46.85%. The clam chowder concentrate gave a penetrometer reading of 3.9. A conventional frozen oyster stew—semi condensed soup (Campbell's) tested under the same conditions gave a penetrometer reading of zero, i.e. too hard for penetration.

The product can be frozen until ready to be used. It is then readily dispersed in water or preferably milk and heated. The foregoing formulation and technique can be readily adapted to make other soup concentrates, such as a seafood bisque, and cream of chicken, mushroom, cheese and other fish, fowl, meat and vegetables.

EXAMPLE 17

A newburg sauce can be made by the technique of this invention to be sold separately or with shell fish, such as lobster or crab. As pointed out previously the fish may be treated to lower its water content by infusing it with stabilizing solutes to make it microbiologically stable at room temperature. However, since the product is kept frozen and can be used promptly after removal from the freezer, the requirements for microbiological stability are not as rigid as for conventional products.

The newburg sauce comprises about from 30 to 40% water, sugar in a ratio to water of about from 1-1.5 to 1, and about from 5 to 30% fat (saturated or unsaturated). The sugar content preferably includes about from 10 to 40% fructose, and the fructose plus dextrose content is about from 75 to 100% of the total sugar. The sauce also contains milk products (from whole and/or dry milk), salt, a stabilizer such as starch, and flavoring. In addition to milk products, other dairy products such as eggs or egg yolks may be added. And fats beyond those found in milk may be used, particularly unsaturated or partially saturated fats, such as margarine. The sauce may contain any of a number of other standard ingredients, each in conventional amounts which can be varied in accordance with known techniques.

The formulation for a crab newburg sauce follows.

| Ingredient | Amount |
|---|---|
| (1) Margarine | 3.06 |
| (2) Egg Yolk | 3.33 |
| (3) Lemon Juice Concentrate | .22 |
| (4) Whole Milk (87.34% Water) | 39.07 |
| (5) Corn Starch | 1.89 |
| (6) Salt | 1.11 |
| (7) Non-Fat Dry Milk | 6.88 |
| (8) Dextrose | 31.11 |
| (9) Fructose-Dextrose Syrup | 13.33 |
| | 100.00 |

The product contained 36.92% water and 40.57% sugar (3.97% fructose, 35.84% dextrose and 0.75% higher sugars). The milk products would contribute about an additional 5% sugar, but in the form of lactose which contributes comparatively little to lowering the osmotic pressure.

The procedure for making this product is to dissolve the corn starch (5) and dry milk (7) in the whole milk (4) and add this to the melted margarine (1) and salt (6). This is heated and stirred until the mixture thickens. The egg (2) and lemon (3) are mixed and stirred into the thickened mixture. Infused crab (about from 30 to 40% of the total formulation) is added, with flavoring as desired, i.e., dry sherry wine and red pepper. The product is cooked for three to four minutes and the sugars (8) and (9) are added and mixed well for ten minutes.

The newburg sauce had a penetrometer value of 14.9mm. A conventional frozen Alaska King Crab-Newburg Sauce (Stauffers) tested under the same conditions was too hard to give a measurable penetrometer reading.

Other sauces such as thermidor, bernaise, hollandaise and cheese may be made by the foregoing technique.

EXAMPLES 18-19

Orange juice and iced tea concentrates were made which maintained fluidity at freezer temperatures and were microbiologically stable. These products overcame the difficulties of removing solid concentrates from cans and dispersing them in water.

The juice and tea concentrates comprise about from 35 to 45% water, sugar in a ratio about from 1.2-1.8:1. The sugar comprises substantially, i.e. 75% to 100%, a mixture of fructose and dextrose. The fructose content is about from about 10 to 30% of the total sugar content.

An orange juice concentrate was made as follows.

| Ingredient | Amount |
|---|---|
| (1) Dextrose | 37.00 |
| (2) Fructose-Dextrose Syrup | 33.00 |
| (3) Citric Acid | .20 |
| (4) Oil of Orange | .15 |
| (5) Water | 29.65 |
| | 100.00 |

The water (5) was heated to 160° F. and held at that temperature while mixing in dextrose (1). The syrup (2) citric acid (3) and oil of orange (4) were then blended into the prepared mixture.

The concentrate was placed in a freezer and afterwards tested for its flow properties with the following results: no flow after 1 minute; 125 ml after 3 minutes; 145 ml after 5 minutes; 230 ml after 10 minutes; and 245 ml after 15 minutes. A conventional orange juice concentrate (Awake) even after 15 minutes was still solid with less than 1 ml flow.

When the above formulation was modified by replacing the syrup with an equal weight of dextrose the product upon freezing gave zero flow at 10 minutes and 15 ml flow after 15 minutes.

The concentrate of the above formulation makes an orange juice drink when mixed with an equal amount of water.

An iced tea concentrate was made from the following:

| Ingredient | Amount | |
|---|---|---|
| (1) Dextrose | 37.00 | |
| (2) Fructose-Dextrose Syrup | 33.00 | |
| (3) Citric Acid | .03 | |
| (4) Oil of Lemon | .27 | (1 drop) |
| (5) Tea Brew | 29.70 | |
| | 100.00 | |

The product was made by boiling 325 grams water and steeping the tea (5 bags—25 grams) for 3-4 minutes to make the tea brew (5). The brew was brought to 160° F. and the dextrose (1) added. Then the syrup (2) citric acid (3) and lemon (4) were mixed in.

The product was frozen and tested for flow characteristics, with the following results; 475 ml after 1 min, 500 ml after 3 minutes, and 525 ml after 5 minutes. A conventional tea concentrate (Nestea Reconstituted) gave less than 5 ml flow after 15 minutes when frozen. When the syrup (2) is replaced by an equal amount of dextrose the frozen product shows no flow through 15 minutes.

EXAMPLE 20

The techniques described may be modified to make ice cream, ice milk, french custard, sherbert and similar products. The ice cream product can remain soft in the freezer so that it can be used immediately upon removal from the freezer.

The ice cream products comprise about 45 to 60% water, sugar in a ratio to water of about from 0.5-1:1, and fat about from 8 to 16%. The total of fructose and dextrose is from about 75 to 100% of the total sugar content, the amount of fructose preferably is 65 to 100% of the total sugar content. The fat is a butter fat.

For non-regulated ice-cream substitutes (where the ingredients can be varied without Government regulation) the water content may be about from 40 to 60%, the sugar to water ratio may be about 0.5 to 1.5:1, fat about from 2 to 16%. The amount of fructose plus dextrose equals about 50 to 100% of the sugar content.

The following is a suitable ice-cream formulation:

| Ingredients | Amount |
|---|---|
| 1) Whole Milk | 40.00 |
| 2) Fructose Concentrate* | 26.88 |
| 3) Heavy Cream | 24.62 |
| 4) Non-Fat Dried Milk | 7.00 |
| 5) Sucrose | .70 |
| 6) Sodium and Calcium Alginate | .30 |
| 7) Polysorbate 60 | .10 |
| 8) Sorbitan Monostearate | .10 |
| 9) Vanilla | .30 |

*This product is an aqueous syrup having 80% sugar, of which 90% is fructose and the remainder dextrose.

The product had a water content of 54.12%, a sugar content of 28.7% (including the sugars in the whole milk, cream, and milk solids) and a fat content of 10.26% (from the milk and cream).

The procedure for making the product was to add the cream and milk to a kettle and begin heating. When 140° F. was reached, the emulsifiers (7 and 8) were added. While stirring, a premix of the sucrose (5) and alginate (6) were added, and then fructose concentrate (2) and milk solids (4). Mixing was continued at 160° F. for five minutes. The product was then homogenized in a first stage at 3000 psi and second stage at 500 psi followed by cooling. The product was whipped to an overrun of 100% and removed at 22° F. This ice-cream was placed in a freezer at about 0°–10° F. for 72 hours and during this entire period, it retained a texture suitable for immediate use. The maintenance of this spoonable texture also permits the ice cream to be packaged in a flexible squeeze package (i.e. a Squiggle-Pak) for dispensing in a ribbon form.

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the are will readily understand. Accordingly, such variations and modifications of the disclosed products are considered to be within the purview and scope of this invention and the following claims.

What is claimed is:

1. A microbiologically stable whippable food product suitable for preparing whipped confections comprising an oil-in-water emulsion having from 15 to 45% water, sugar in a ratio to water of about from 1–2:1, about from 2.5 to 30% fat, and minor but effective amounts of salt, emulsifier, stabilizer and flavoring, provided that the amount of fat is less than the amount of water, the solutes content is adequate to provide the product with a water activity of about from 0.8 to 0.9, in said sugar the amount of dextrose plus fructose is at least about 50% based upon the total sugar content, wherein the foregoing ingredients comprise at least one of fructose and unsaturated fat and the product is spoonable at about 10° F.

2. The product of claim 1 wherein the fat content comprises a polyunsaturated to saturated fat ratio (P/S) of about from 0.38–0.74.

3. A microbiologically stable butter cream product in accordance with claim 1 comprising about from 25 to 45% water, sugar in a ratio to water of about from 1–1.5:1, and about from 10 to 30% fat, provided that the amount of fructose is about from 15 to 65% based on the sugar content and the amount of dextrose is at least about 50% based upon the remaining total sugar content, the amount of fat is less than the amount of water and water soluble liquid phase, and the fat content comprises about from 10 to 60% unsaturated fat wherein the foregoing ingredients are adapted to provide a product which will flow at about 10° F.

4. A microbiologically stable whippable product in accordance with claim 1, suitable for use in preparing a of a whipped topping, comprising about from 25 to 45% water, sugar in a ratio to water of about from 1:1 to 1.5:1, and about from 10 to 30% fat, provided that the amount of fructose is about from 15 to 65% based on the sugar content and the amount of dextrose is at least about 50% based upon the remaining sugar content, and the fat content includes about 40 to 60% unsaturated fat, wherein the foregoing ingredients are adapted to provide a flowable product at about 10° F.

5. The product of claim 4 containing an inert gas whereby the volume of said product is increased by at least 150%.

6. A microbiologically stable whippable product in accordance with claim 1 suitable for preparation of a low-fat whipped cream, comprising about from 25 to 45% water, sugar in a ratio to water of about from 1–2:1, about from 10 to 15% fat, wherein the amount of fructose is about from 15 to 65% based on the sugar content, the fat content includes at least 10% unsaturated fat, and the foregoing ingredients are adapted to provide a product which is spoonable at about 10° F.

7. The product of claim 6 containing an inert gas and having an overrun of greater than about 150%.

8. A microbiologically stable whippable food product in accordance with claim 1, adapted to be mixed with milk, comprising an oil-in-water-emulsion having about 25 to 40% water, sugar in a ratio to water of about from 1–1.5:1, and about from 10 to 25% fat, wherein the amount of fructose is about from 15 to 65% of the sugar content, the fat content includes about at least 50% unsaturated fat and the foregoing product being flowable at about 10° F.

9. A microbiologically stable whippable milk shake-type base product, in accordance with claim 1 comprising about from 35 to 45% water, sugar in a ratio to water of about from 1–1.5:1, about from 3 to 10% fat, and a minor but effective amount of a protein whipping aid wherein the amount of fructose is about from 15 to 65% of the total sugar content and dextrose is at least 50% of the remainder of the sugar, and the fat content is about at least 50% unsaturated, wherein the foregoing product is flowable at about 10° F.

10. The product of claim 9 containing at least an equal volume of inert gas and which is flowable at about 10° F.

11. The product of claim 3 containing an inert gas and having an overrun of greater than about 150%.

12. The product of claim 1 or 3 wherein the emulsifier comprises about from 0.2 to 1.5%.

13. The product of claim 1 or 3 wherein the stabilizer comprises about from 0.1 to 0.5%.

14. The product of claim 1 or 3 wherein the salt comprises about from 0.1 to 1%.

15. The product of claim 1 or 3 which contains about from 0.3 to 3% protein.

16. The product of claim 1 or 3 which contains about from 2.5 to 30% unsaturated fat having an iodine value of about at least 100.

17. The product of claim 1 which contains sugar in a ratio to water of about from 1–1.5:1.

18. The product of claim 17 in which the fructose comprises about from 10 to 65% of the total sugar content.

19. The product of claim 18 in which the amount of dextrose plus fructose is at least 75% based on the total sugar content.

20. The product of claim 3 containing an inert gas and having a specific gravity of about 0.3 to 0.4.

21. The product of claim 3 wherein the total amount of fructose plus dextrose is about from 75 to 100% of the sugar content.

22. The product of claim 3 wherein said fat is about from 10 to 60% unsaturated or partially unsaturated fat.

23. The method of making a microbiologically stable whippable food product which is spoonable at freezer temperatures which comprises mixing together about from 15 to 45% water, sugar in a ratio to water of about from 1-2:1, about from 2.5 to 30% fat, and minor but effective amounts of salt, emulsifier, stabilizer and flavoring, provided that the amount of fat is less than the amount of water, the solutes content is adequate to provide the product with a water activity of about from 0.8 to 0.9, and the sugar comprises at least about 50% dextrose plus fructose; pasteurizing the mixture, then homogenizing the mixture and cooling the resultant product.

24. The method of claim 23 which comprises making a microbiologically stable buttercream product which is spoonable at freezer temperatures by mixing together from about 25 to 45% water, sugar in a ratio to water of from 1-5:1, about from 10 to 30% fat, and a minor but effective amounts of salt, emulsifier, stabilizer and flavoring, wherein the amount of fat is less than the amount of water, the solutes content is adequate to provide the product with a water activity of from about 0.8 to 0.9, and the sugar comprises from 15 to 65% fructose, and at least about 50% of the remaining sugar is dextrose; pasteurizing the mixture, then homogenizing the mixture and cooling the resultant product.

25. The method of claim 24 which further comprises whipping the buttercream product to a specific gravity of about 0.3 to 0.4.

26. The method of claim 24 wherein said cooling is to a temperature at least as low as refrigerator temperature, and said buttercream is whipped at said refrigerator temperature.

27. The method of claim 24 wherein said cooling is to a temperature at least as low as freezer temperature, and said buttercream is whipped at said freezer temperature.

28. The method of claim 24 comprising mixing said sugar and water, heating the mixture, adding said fat, homogenizing the mixture and cooling the mixture to about 38 to 42° F.

* * * * *

UNITED STATES PATENT AND TRADEMARK OFFICE
CERTIFICATE OF CORRECTION

PATENT NO. : 4,146,652
DATED : March 27, 1979
INVENTOR(S) : Marvin L. Kahn and Eapen K. Eapen It is certified that error appears in the above-identified patent and that said Letters Patent are hereby corrected as shown below:

Column 4, line 7, change "shales" to -- shakes --

Column 15, line 41, change "1000.00" to -- 100.00 --

Column 17, line 33, change "unti" to -- until --

Column 21, line 26, change "as" to -- at --

Claim 24, column 33, line 16, change "1-5:1" to --1-1.5:1 --

Signed and Sealed this

Sixteenth Day of October 1979

[SEAL]

Attest:

RUTH C. MASON
Attesting Officer

LUTRELLE F. PARKER
Acting Commissioner of Patents and Trademarks